UNITED STATES PATENT OFFICE.

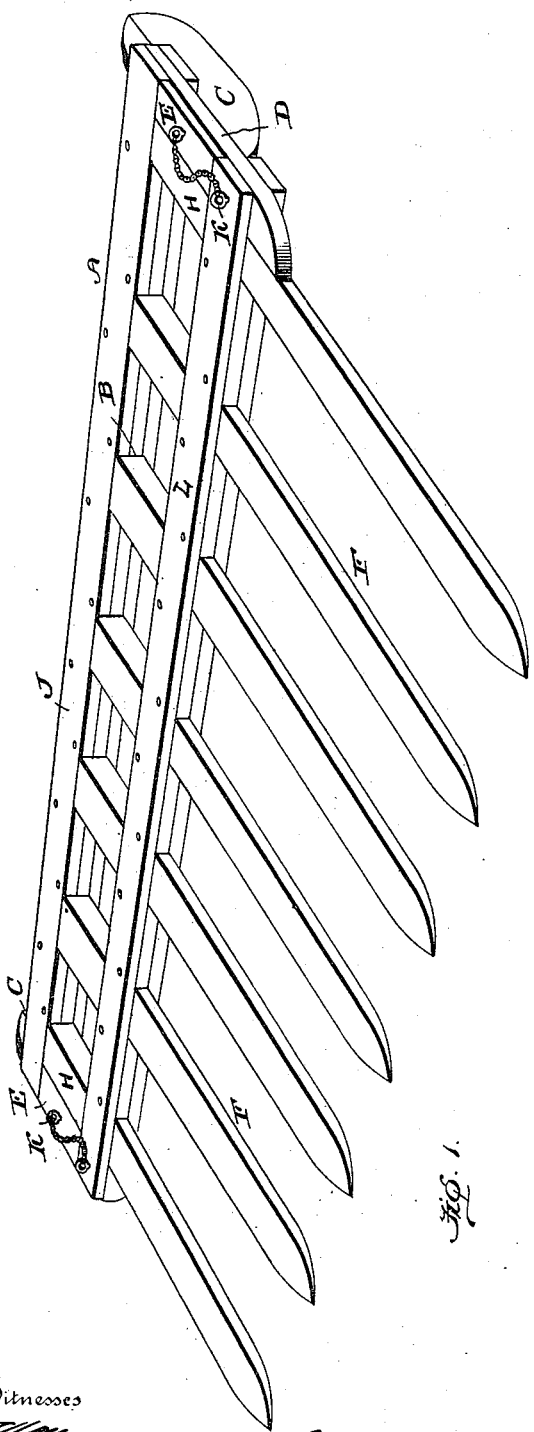
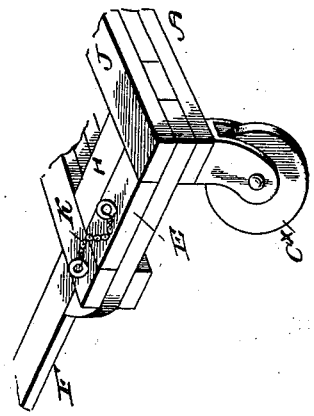

CHARLES O. MASON, OF STROTHER, MISSOURI.

HAY-RAKE.

SPECIFICATION forming part of Letters Patent No. 663,288, dated December 4, 1900.

Application filed June 16, 1900. Serial No. 20,511. (No model.)

*To all whom it may concern:*

Be it known that I, CHARLES O. MASON, a citizen of the United States, residing at Strother, in the county of Monroe and State of Missouri, have invented certain new and useful Improvements in Hay-Rakes, of which the following is a specification, reference being had therein to the accompanying drawings.

My invention relates to improvements in hay-rakes; and the main object of my invention is the provision of a rake which will allow of the teeth or tines being quickly detached or applied in order that the rake may be quickly transported from place to place; further, to permit it to be easily stored and shipped; further, to enable the replacing of a new tooth or tine in the event of breakage, and, finally, to render the construction simple, inexpensive, durable, and thoroughly practical.

To attain the desired objects, my invention consists of a hay-rake embodying novel features of construction and combination of parts, substantially as disclosed herein.

Figure 1 represents a perspective view of a hay-rake constructed in accordance with and embodying my invention. Fig. 2 represents a vertical sectional view through one of the teeth and frame, and Fig. 3 represents a detail view.

A is a bar or rail provided with a series of sockets or seats B and mounted upon slides C or rollers $C^\times$ to enable the rake to be easily drawn over the ground, and at the ends of the frame are the bars D, provided each on one side with the extensions or wings E.

The rake teeth or tines F are formed at their rear ends G to fit in the sockets or seats of the frame and are provided on one side with extensions or wings H similar and in line with the extensions or wings on the bars D, and fitting over the rake-teeth and resting upon the series of extensions is the bar J.

L is a bar forward of the bar J, which serves to secure the teeth or tines rigidly in place, but to allow the removal of the teeth when desired, the said bar being held in place by the detachable fastenings K at each end of the bar, as is evident. From this construction it will be seen that the teeth fit snugly in the frame and are retained by the bar, and when desired to remove the teeth it is simply necessary to detach the fastenings at each end of the bar, which releases the bar, and the teeth can then be instantly removed.

My improvements add greatly to the usefulness and practicability of rakes and enable the shipping or transporting of the rake with great ease and facility, permit the application or removal of the teeth for any purpose, enable the rake to be stored in a very small space, and do not add to the expense of the implement.

I claim—

1. In a hay-rake, the combination with a frame consisting of two parallel bars and intermediate portions, of teeth having one end held in sockets formed by said bars and intermediate portions, transverse bars at the ends of said frame, a removable bar parallel with the parallel bars of the frame and engaging said teeth forward of their rear ends, and removable fastenings for holding the said removable bar in position, as shown and described.

2. The combination of a frame with sockets, runners on which said frame is mounted, teeth having one end inserted in said sockets, and provided with forward and rearward shoulders, bars at the end of said frame, a forward bar engaging the forward shoulders of the teeth, and detachable fastenings at the ends of said forward bar for holding it in place, substantially as described.

In testimony whereof I affix my signature in presence of two witnesses.

CHARLES O. MASON.

Witnesses:
J. R. MURPHY,
D. B. ELLIS.